United States Patent [19]
Jacobs

[11] 3,738,118
[45] June 12, 1973

[54] MEANS FOR LUBRICATING VEHICLE AIR CONDITIONING COMPRESSOR SHAFT SEALS

[75] Inventor: James W. Jacobs, Dayton, Ohio
[73] Assignee: General Motors Corporation, Detroit, Mich.
[22] Filed: Jan. 31, 1972
[21] Appl. No.: 221,938

[52] U.S. Cl. ............... 62/192, 62/193, 62/230, 62/243, 62/323
[51] Int. Cl. .............................................. B60h 3/04
[58] Field of Search .................. 62/133, 192, 158, 62/193, 230, 243, 244, 323

[56] References Cited
UNITED STATES PATENTS
2,720,087   10/1955   Groene ........................... 62/323 X
3,062,020   11/1962   Heidhorn ........................ 62/193 X Primary Examiner—William F. O'Dea
Assistant Examiner—Peter D. Ferguson
Attorney—Frank J. Soucek and Charles R. Engle

[57] ABSTRACT

A vehicle air conditioning control system including means for lubricating seals such as compressor shaft seals during prolonged cold weather vehicle use when air conditioning is not required. A momentarily closed relay, responsive to use of the vehicle, is connected in the air conditioning electrical control circuitry in a current path independent of the normal air conditioning energizing circuit. This momentarily closed relay energizes the air conditioning compressor during each use of the vehicle for time period sufficient for proper lubrication of compressor shaft seals but sufficiently short to prevent cooling during cold weather. Lubrication of the seals during each use maintains a thin film of lubricant between rotating and non-rotating faces of the seal preventing frictional heating of the seal faces and consequent damage that would prevent the faces from supporting the necessary sealing lubricant film.

3 Claims, 5 Drawing Figures

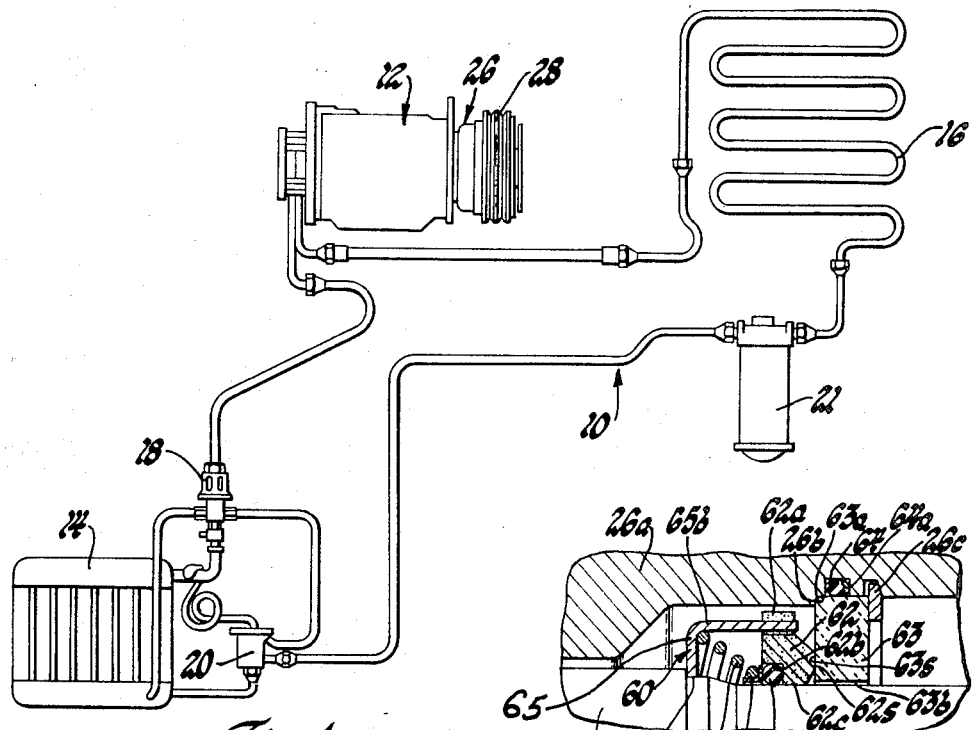
Fig.1
Fig.2a
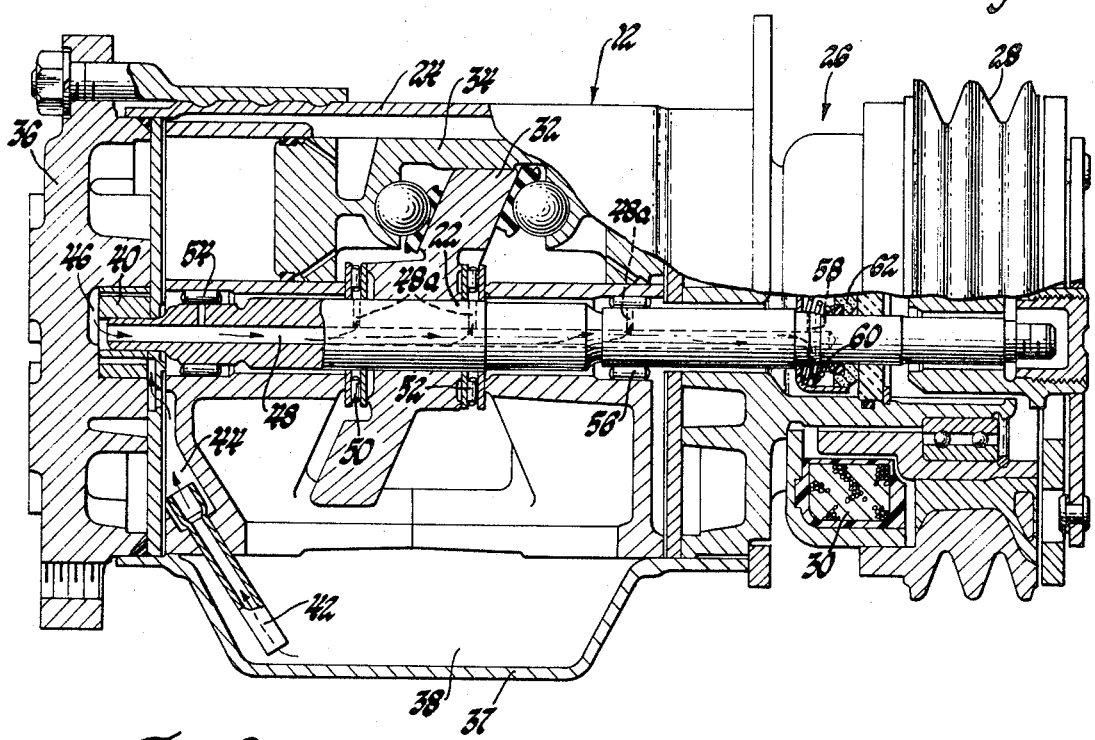
Fig.2

MEANS FOR LUBRICATING VEHICLE AIR CONDITIONING COMPRESSOR SHAFT SEALS

This invention relates to a vehicle air conditioning system including means for momentarily energizing the compressor during each use of the vehicle. More particularly, this invention relates to such a means for insuring lubrication of compressor shaft seals although the air conditioning system is not in use.

A frequent problem in the vehicle air conditioning art has been the failure of compressor shaft seals resulting from prolonged periods of non-use during cold weather. These shaft seal failures have occurred because of a lack of lubricant being supplied to the seals during the prolonged periods and lubricant normally existing between the relatively rotating parts has for one reason or another drained away. Use of the system, in this condition, for example, when warm weather first appears, results in direct frictional engagement of the seal faces generating heat permanently damaging the seal to the extent the faces can no longer support the required sealing lubricant film. Therefore, it is a purpose of this invention to overcome air conditioner compressor seal failure by momentarily activating the compressor from time to time for a period sufficient to supply lubricant to the seals while being short enough to avoid cooling. The supplied lubricant retains the sealing lubricant film required between the mating sealing surfaces to prevent loss of lubricant and refrigerant during the summer months. This purpose is accomplished in a preferred embodiment by providing a momentarily actuated electrical relay in parallel circuit with the usual ambient air switch that is responsible to open the control circuit when the ambient air temperature is, for example, 32° F. or below. The relay is effective to bypass the open ambient air switch and energize an electrically actuated clutch drivingly connecting the air conditioning compressor with the vehicle engine. The compressor is driven with a predetermined time period under the regulation of the relay. Of course, the momentarily actuated relay can be delayed until the engine is running properly. The delay can be accomplished by using a double switch relay including a normally open switch and a normally closed switch. Closure of the ignition switch would energize the relay and 15 seconds later, the normally open switch would close completing the circuit to the compressor clutch. After 30 seconds elapsed time from closure of the ignition switch the normally closed switch would open deenergizing the compressor clutch. It is apparent that the desired result of this invention could be obtained by using various devices to momentarily energize the compressor clutch. The circuit to the clutch could be closed by a mechanical cam arrangement sensing movement of the vehicle or that of a moving engine component. Further, a cam motor energized by the ignition switch could be utilized so that after every so many hours of engine operation, the cam would be actuated providing air conditioning compressor operation at predetermined intervals.

It is, therefore, a general object of the present invention to provide a means for lubricating vehicle air conditioning compressor seals during prolonged periods of non-use.

A more particular object of the present invention is to provide a momentarily closed switch means energizing the compressor clutch at specified times during operation of the vehicle for periods of operation sufficient to lubricate compressor shaft seals but sufficiently short to prevent cooling during cold weather conditions.

Another object of the present invention is to provide a momentarily closed relay connected in electrical circuit with the compressor clutch and being responsive to vehicle operation to energize said clutch independently of whether the air conditioning system is operating.

A still further object of the present invention is to provide a momentarily closed relay that delays energizing the compressor clutch until the vehicle engine has been in operation for a predetermined time period and then energizes the clutch for a period sufficient to lubricate compressor seals while sufficiently short to prevent vehicle cooling.

The novel features which I believe to be characteristic of my invention are set forth with particularity in the appended claims. My invention itself, however, both as to its organization and method of operation, together with further objects and advantages thereof, will be best understood by reference to the following description taken in conjunction with the accompanying drawings in which:

In the Drawings:

FIG. 1 is a schematic drawing illustrating the fluid circuit of a vehicle air conditioning system.

FIG. 2 is a partial cross sectional enlarged view of an air conditioning compressor illustrating flow of lubricant therethrough.

FIG. 2a is an enlarged fragmentary portion of FIG. 2 showing the detailed structure of the shaft seal assembly.

Figure 3:
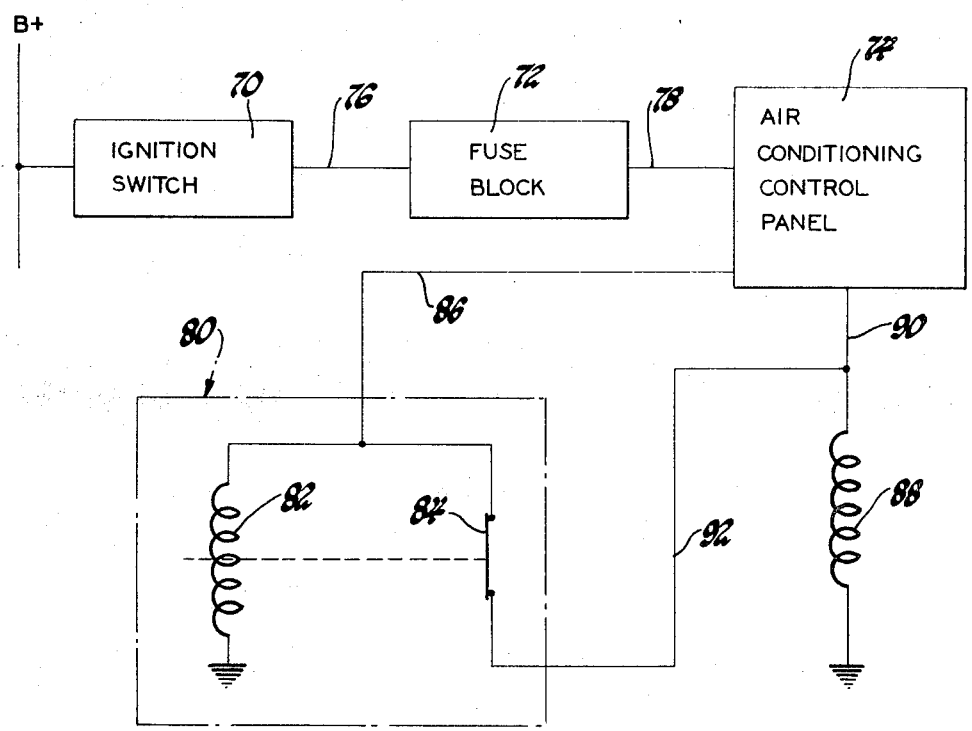
FIG. 3 is a schematic diagram of the automatic control circuit associated with the air conditioning fluid circuit illustrated in FIG. 1 including the time delay relay of this invention.

With reference to FIG. 1, an air conditioning fluid circuit 10 is illustrated as including a compressor 12, an evaporator 14, and a condenser 16. A suction throttling valve 18 is in the fluid circuit between the compressor 12 and the evaporator 14 while an expansion valve 20 is utilized in series with a dehydrator receiver 21 between the evaporator 14 and condenser 16.

The compressor 12 is shown in detail in FIG. 2 wherein a shaft 22 extends through a compressor casing 24 and is driven by an electrically engaged clutch shown generally at 26. The clutch 26 includes a driving pulley assembly 28 that is selectively engaged with the shaft 22 when solenoid coil 30 of the electric clutch 26 is energized. The shaft 22 receives a swash plate 32 fixed for rotation therewith and reciprocating dual acting piston assemblies 34 circumferentially spaced about the shaft 22 in housing 24. The reciprocating movement of the double acting pistons 34 pressurizes fluid in the housing 24 for discharge through an end plate 36. Fluid is also supplied to the compressor 12 through end plate 36, neither of these passages being shown. The housing 24 includes a distended portion 37 defining an oil sump 38 which collects an oil and refrigerant mixture for circulation through the compressor shaft 22 lubricating its associated bearings and seals, the circulation being provided by a lubricating gear pump assembly 40 secured at the left end of shaft 22 viewed in FIG. 2. Lubricating oil and refrigerant are drawn from the sump 38 through conduit 42 to a passage 44 connecting with the inlet side of gear pump 40. Pump 40 discharges the pressurized mixture into chamber 46 from which is flows through an axial passage 48 in shaft 22 to lubricate needle thrust bearing assemblies 50 and 52 as well as radial needle bearing assemblies 54 and 56 through radial passages 48a. The oil mixture also exits axial passage 48 via orifice 58 to lubricate a shaft seal assembly 60. The oil supplied to the aforementioned bearings and the seal assembly 60, returns to sump 38 via passages not shown.

The shaft seal assembly 60 is best illustrated in FIG. 2a and includes a carbon seal element 62 fixed to rotate with shaft 22 and a ceramic seal element 63 non-rotatably mounted within clutch housing 26a against a shoulder 26b by a snap ring 26c. An o-ring 64 is received within a notch 64a and sealingly engages the outer circumferential surface 63a of the seal element 63 preventing flow of a mixture of lubricant and refrigerant between the housing and element 63. The inner circumferential surface 63b of element 63 is retained out of engagement with the shaft 22 as shown. A cage 65, formed of a suitable metal, contains an aperture 65a having at least one flat driving surface engaging a like surface of shaft 22, neither of which surfaces are shown, when the cage is placed on the shaft. The flat surfaces provide a driving engagement between the cage 65 and shaft 22. The carbon seal element 62 has a notch 62a receiving end 65b of the cage 65 so that the element 62 rotates with the cage and the shaft 22. Carbon seal element 62 also contains a circumferential notch 62b at its inner surface 62c which receives an o-ring seal 66. An annular washer 67 is biased to compress the o-ring seal 66 into sealing contact with the shaft 22 by a conical helical spring 68 placed in compression between cage 65 and the washer 67.

From the preceding description, it is apparent that the carbon element 62 is mounted for rotation with the compressor shaft 22 and is sealed at its inner surface 62c by o-ring 66 under the influence of spring 68 preventing flow of fluid between the element 62 and shaft 22. The ceramic seal element 63 is stationary and is sealed at its outer surface 63a by o-ring 64. The carbon element 62 has a seal face 62s that is biased toward a like face 63s of the ceramic element 63, so that these faces cooperate to support a thin sealing lubricant film therebetween providing the fluid seal between these elements. A thin film of lubricant or mixture of lubricant and refrigerant must be provided between these faces at all times to prevent frictional engagement thereof and actually provide the desired seal during operation of the compressor. Should the compressor be inactive for a prolonged period of time and this thin sealing film of lubricant be lost for any reason, including drainage of the lubricant mixture to another portion of the system or loss to atmosphere by virtue of a pressure differential between that within the compressor and atmospheric pressure, operation of the compressor results in frictional engagement of the seal faces 62s and 63s. This frictional engagement generates heat which destroys or scores the faces making them unable to properly support the sealing film required to prevent loss of the refrigerant and lubricant. The heat so generated can also destroy the pliability of the o-rings 64 and 66 and consequently destroy the entire seal assembly. It is for this reason the compressor must be activated periodically to prevent loss of this sealing film during prolonged periods of non-use of the air conditioning system.

A schematic of an electrical control circuit incorporating provisions of the subject invention is shown in FIG. 3. A vehicle ignition switch 70 selectively connects a source, a vehicle storage battery, not shown, to a fuse block 72 regulating the supply of current to an air conditioning control panel 74. Ignition switch 70 is connected with the fuse block 72 by a lead 76, while the latter is connected in circuit with the control panel 74 via lead 78. The control panel 74 is of the usual type, i.e., either manually or automatically operable to provide a desired temperature within the vehicle compartment. It does contain an ambient air sensor switch, not shown, that normally disables the air conditioning system in cold weather, such as when outside air temperatures are at 32° F. or below.

As also shown in FIG. 3, a relay 80 including a coil 82 and a normally closed switch 84 is connected to the control panel 74 by a relay input lead 86. The relay 80 is connected to the panel 74 so that it is effective to momentarily energize a compressor clutch solenoid coil 88 each time the ignition switch 70 is closed. This is accomplished by the fact that switch 84 is connected to a solenoid input lead 90 by electrical lead 92. The relay input lead 86 is connected in the control panel 74 so that a circuit is completed therethrough from the ignition switch 70 to the relay 80 regardless of the position of the aforementioned ambient air sensor switch in the panel 74.

In operation, closure of the ignition switch energizes coil 82 of the relay 80 through the control panel 74 and simultaneously a circuit is completed to the compressor clutch solenoid coil 88 through switch 84. The air conditioning compressor is consequently actuated and lubricant is supplied to its shaft seals by pump 40 shown in FIG. 2. The relay 80 can be set for any time period sufficient to properly lubricate the compressor seals including seal assembly 60, while retaining the period sufficiently short to prevent cooling of the vehicle in cold weather thereby avoiding the possibility of evaporator freezing. After a period of, for example, 10 – 15 seconds the switch 84 is opened by coil 82 and the compressor clutch solenoid coil 88 is deenergized.

Figure 4:
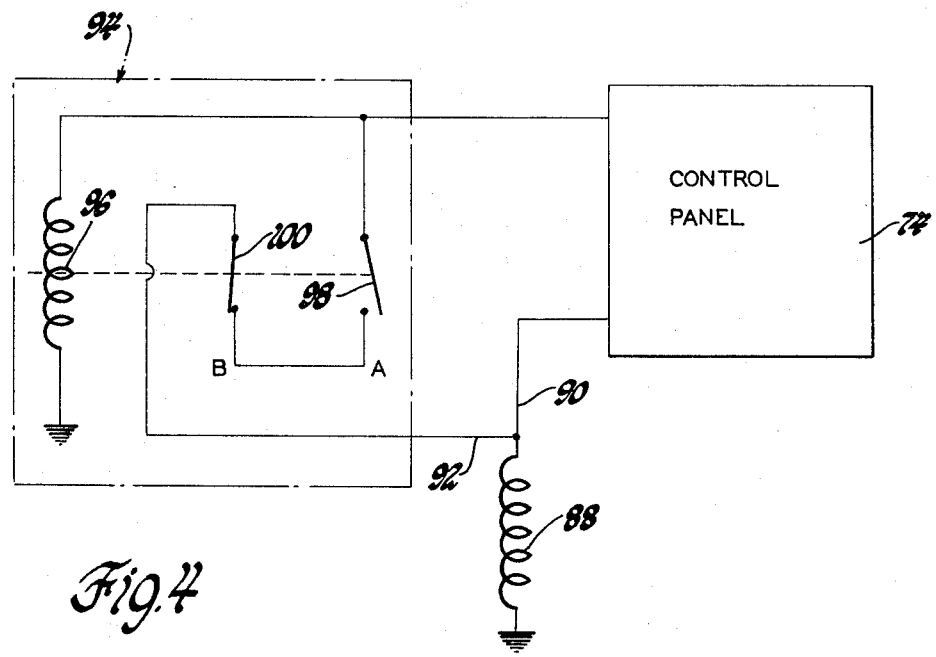
FIG. 4 is also a schematic diagram illustrating a modification of the time delay relay illustrated in FIG. 3.

A modified time delay relay 94, connected either in parallel or in the circuitry to bypass the ambient sensor switch in panel 74, is shown in FIG. 4. In this arrangement, a coil 96 positions dual switches 98 and 100. Switch 98 is normally open while switch 100 is normally closed. After 15 seconds elapsed time from closure of ignition switch 70, switch 98 closes and after 30 seconds elapsed time, switch 100 opens thereby maintaining the clutch solenoid coil 88 energized for a period of 15 seconds insuring proper lubrication of the shaft seal assembly 60 and the shaft bearings during each engine start-up as described with the circuit in FIG. 3.

As indicated in the above description, the subject invention provides a means for automatically energizing a vehicle air conditioning compressor upon closure of the ignition switch during prolonged periods of non-use. The time delay relay provided in the air conditioning control circuit to accomplish this result can incorporate any time period necessary for adequate lubrication of the bearings and seals associated with the compressor. It is significant that this time delay relay can readily be incorporated with any automatic control circuit by the mere addition of the relay in parallel with an ambient air sensing switch.

While preferred embodiments of the invention are shown for purposes of illustration it will, of course, be understood that alternative forms may be provided without departing from the true spirit and scope thereof. A mechanical cam arrangement responsive to operation of the vehicle could, for example, accomplish the result of the above described embodiments. Therefore, it is intended that appended claims cover all such modifications and alternative constructions falling within their true spirit and scope.

I claim:

1. In a vehicle air conditioning system for use in a vehicle having an engine and an ignition switch and in which the system has prolonged periods of non-operation while the vehicle is being normally operated, a compressor including fluid seals disposed between surfaces that move relative to each other when the compressor is mechanically driven and subject to frictional damage when the compressor has a prolonged period of not being mechanically driven due to loss of lubricant therebetween, a lubricating pump driven when said compressor is mechanically driven, a clutch selectively drivingly connecting said compressor with the vehicle engine, a solenoid including a coil effective when energized to actuate said clutch, and control circuitry including the engine ignition switch energizing the solenoid for air conditioning operation, the improvement comprising: means momentarily energizing said solenoid coil during normal operation of the vehicle while being independent of whether the air conditioning system is operating, said means energizing said solenoid coil for a time period sufficient to energize said lubricating pump thereby properly lubricating said compressor fluid seals at specified intervals of normal vehicle operation preventing frictional damage thereto.

2. In a vehicle air conditioning system for use in a vehicle having an engine and an ignition switch and in which the system has prolonged periods of non-operation while the vehicle is being normally operated, a compressor including fluid seals disposed between surfaces that move relative to each other when the compressor is mechanically driven and subject to frictional damage because of a loss of lubricant when the compressor has a prolonged period of not being mechanically driven, a lubricating pump driven when said compressor is mechanically driven, a clutch selectively drivingly connecting said compressor with the vehicle engine, a solenoid including a coil effective when energized to actuate said clutch, and control circuitry including the engine ignition switch energizing the solenoid for air conditioning operation, the improvement comprising: an electrical relay effective when energized to establish a close circuit to said solenoid for a time period independent of whether the air conditioning system is operating, said solenoid drivingly connecting said compressor with the vehicle engine through said clutch whereby said lubricating pump is driven for a time period sufficient to properly lubricate the compressor fluid seals while being activated for a period sufficiently short to prevent cooling of the vehicle compartment and evaporator freeze-up.

3. In a vehicle air conditioning system for use in a vehicle having an engine and an ignition switch and in which the system has prolonged periods of non-operation while the vehicle is being normally operated, a compressor including a fluid seal utilizing a thin sealing fluid film disposed between seal faces that move relative to each other when the compressor is mechanically driven and the seal faces being subject to frictional damage when the thin sealing film is lost because the compressor has a prolonged period of not being mechanically driven, a lubricating pump driven when said compressor is mechanically driven, a clutch selectively drivingly connecting said compressor with the vehicle engine, a solenoid including a coil effective when energized to actuate said clutch, and control circuitry including the engine ignition switch energizing the solenoid for air conditioning operation, the improvement comprising: a momentarily closed time delay relay, means defining an energizing circuit for said relay including the ignition switch but otherwise independent of whether the air conditioning system is operating whereby closure of said ignition switch completes a circuit through said means and said time delay relay to said solenoid so as to drivingly connect said compressor to the engine through said clutch whether or not air conditioning operation is called for, the solenoid being energized for a predetermined time period sufficient to pump lubricating oil to the compressor seal faces and maintain the thin sealing film therebetween during prolonged periods when the air conditioning system is not otherwise utilized, said time delay period being sufficiently long to supply sufficient lubricant and sufficiently short to avoid perceptible vehicle cooling.

* * * * *